UNITED STATES PATENT OFFICE.

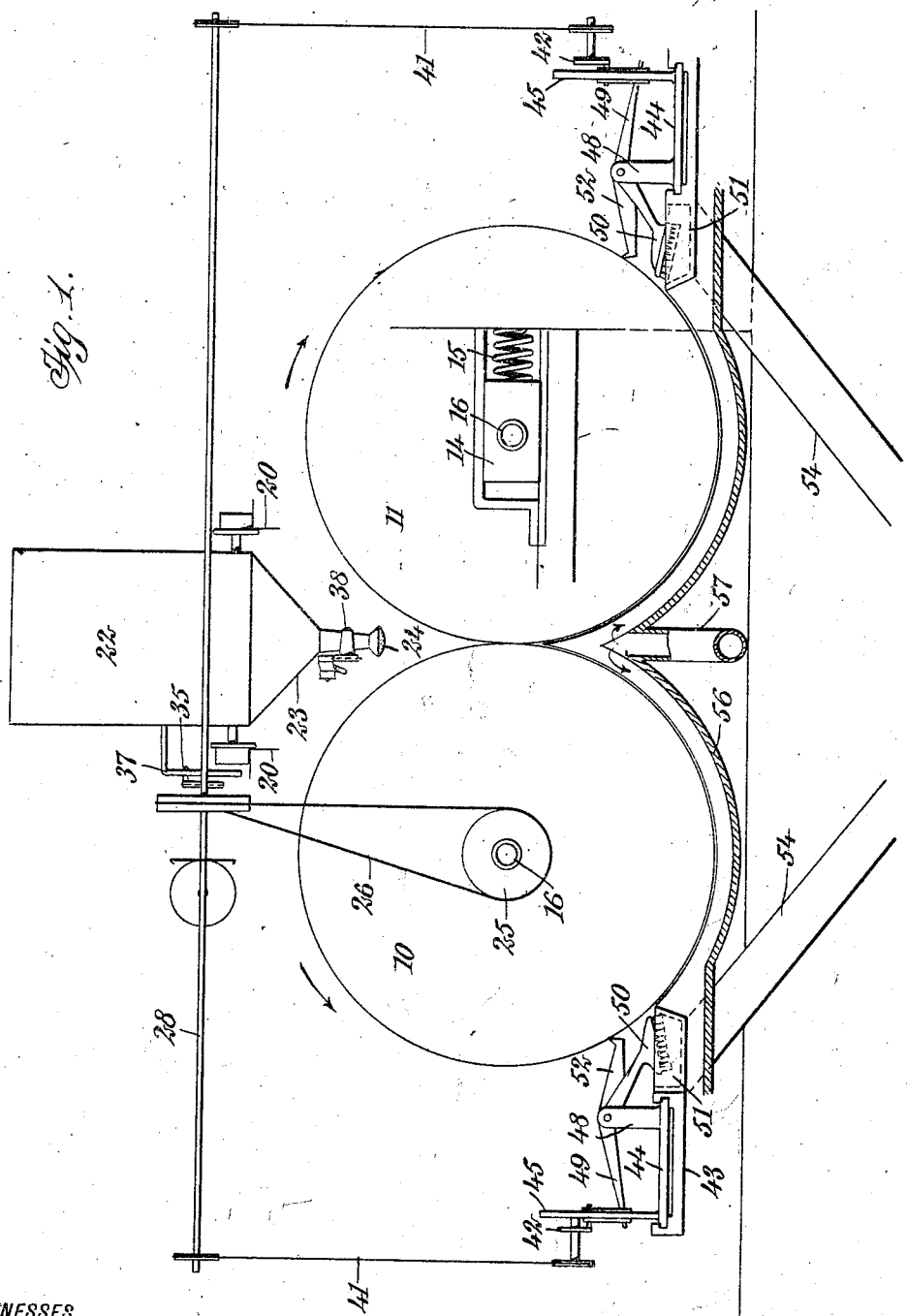

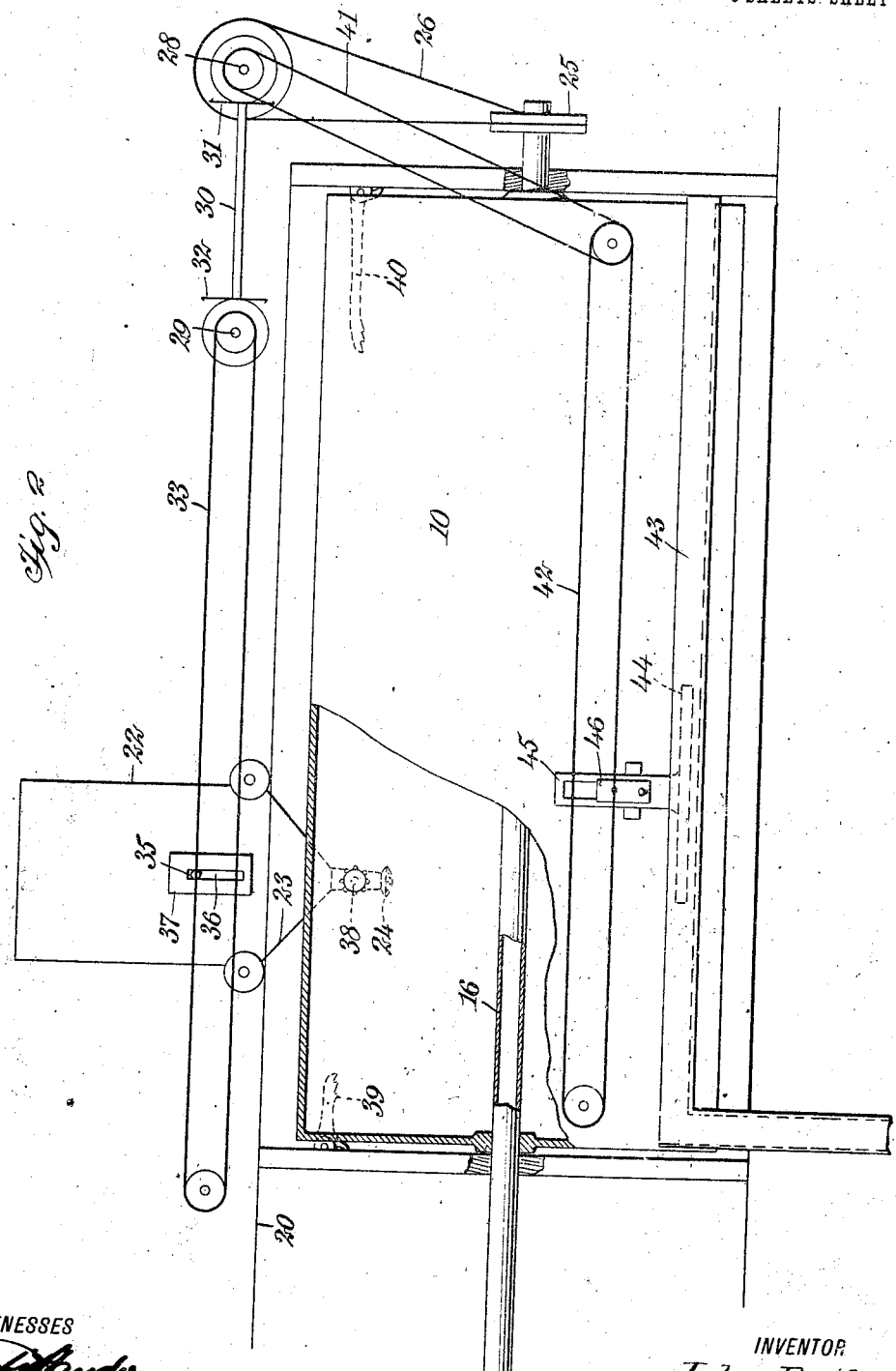

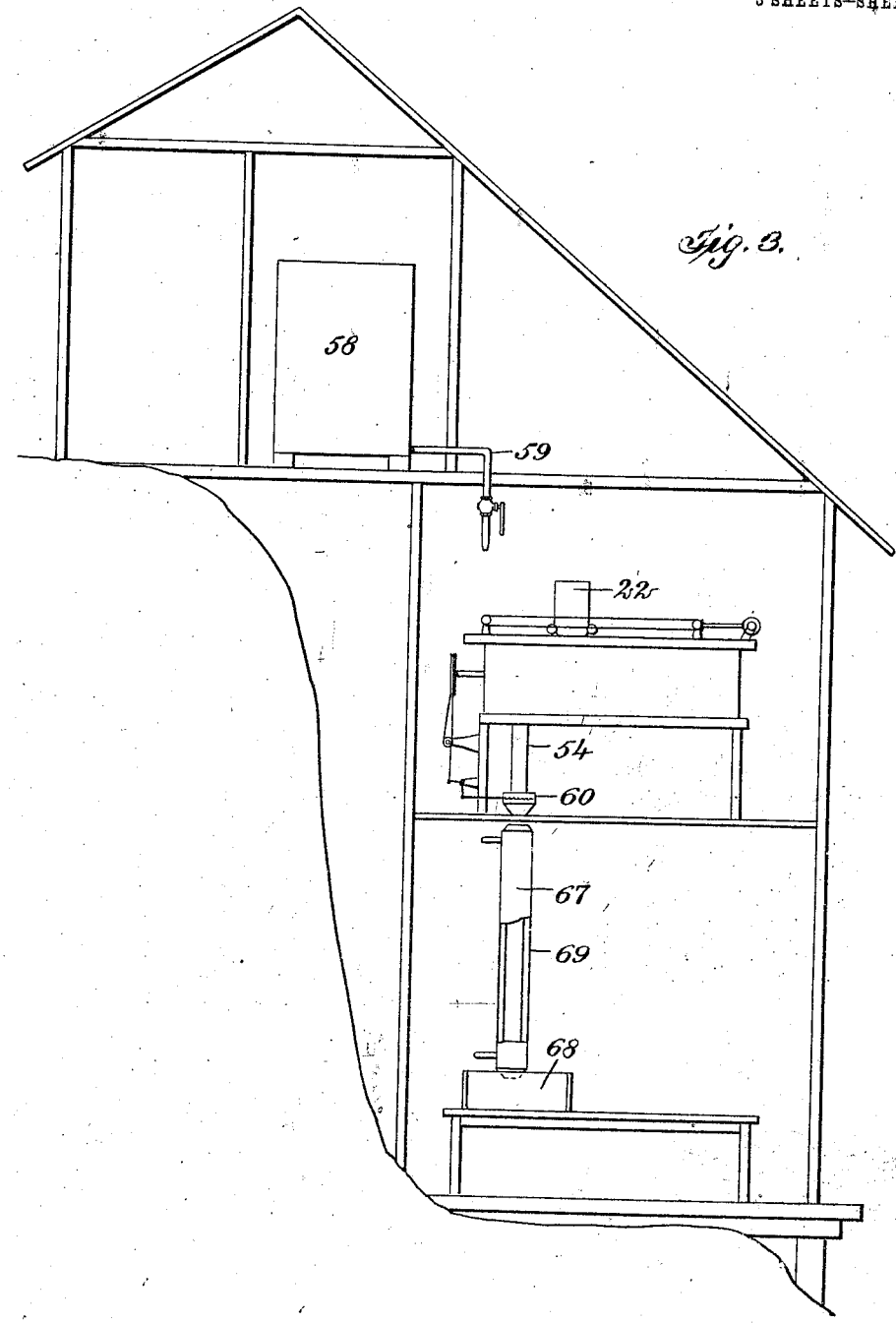

JOHN ROEH, OF SPOKANE, WASHINGTON, ASSIGNOR TO CRYSTALIZED MILK CO., A CORPORATION, OF SPOKANE, WASHINGTON.

PROCESS OF DESICCATING MILK.

1,014,609.     Specification of Letters Patent.     Patented Jan. 9, 1912.

Original application filed August 13, 1908, Serial No. 448,302. Divided and this application filed January 15, 1909. Serial No. 472,431.

*To all whom it may concern:*

Be it known that I, JOHN ROEH, a citizen of the United States, and a resident of Spokane, in the county of Spokane and State of Washington, have invented a new and Improved Process of Desiccating Milk, of which the following is a full, clear, and exact description.

This invention relates to the treatment of milk for the production of a crystalline or powdered product by the removal of the water therefrom, and is also applicable to the concentrating or dehydrating of other substances having similar properties.

By means of my improved process, I obtain a milk product in a light finely subdivided powdered form containing all of the solids including the fatty substances of the milk, in such a condition that they are freely soluble in water to produce a milk similar in all respects to fresh milk, and without necessitating the adding of any foreign substance whatever thereto either before or after the drying or dehydrating action. To secure this product, I take the raw milk in its natural state and spread it very thinly on glass or enameled plates or cylinders, or other hard surfaces, heated to a temperature ranging from 110 to 150 degrees Fahrenheit, and deliver a current of warm artificially dried air against the thin film of milk. During the heating and evaporating of the milk, the latter is repeatedly pressed into engagement with the surface by a rolling action and this heating is continued and the rolling is repeated until the milk is evaporated to dryness and is transformed into a hard uniform coating, which when scraped from the surface produces a white fluffy powder. This powder is immediately removed, passed through a fine mesh screen, heated to such a temperature as will thoroughly sterilize the same, and is then packed at once in airtight receptacles previously sterilized. The milk is not heated to sufficiently high temperature to cause any chemical change in the caseins, proteids, or other solid constituents, but is spread out in such a thin film that in the presence of the current of warm artificially dried air and the action of the heated surface, the water is removed and the solids reduced to a state of complete dryness.

I will now describe the details of my process, and in order to render the same clear, reference will be had to the accompanying drawings, forming a part of this specification, in which similar characters of reference indicate corresponding parts in all the figures, and in which—

Figure 1 is an end view of an apparatus constructed for the carrying out of my improved process; Fig. 2 is a side view thereof, a portion being broken away; and Fig. 3 is a side elevation showing somewhat diagrammatically other portions of the mechanism.

Any suitable form of apparatus may be employed for carrying out my improved process, but preferably I employ that disclosed in my prior application, Serial Number 448,302, filed August 13, 1908, and of which application this is a division. Said apparatus is illustrated somewhat diagrammatically, as certain of the details of the apparatus have no bearing on the steps of the process. The apparatus illustrated includes two parallel drums 10 and 11 mounted in suitable journal boxes and rotated at the same speed in contact with each other throughout their length. The drums may be adjusted toward and from each other to permit the accumulation of a coating upon the surfaces of the drums, one of the journal boxes 14 of one of the drums being slidably mounted for this purpose. A spring 15 serves to hold the drums in resilient engagement irrespective of the thickness of the coating. The drums are hollow and are internally heated in any suitable manner, as, for instance, by the delivery of steam or other heating fluid through the hollow shafts 16, 16 of the two drums.

Supported above the two drums and extending longitudinally thereof are two rails 20, 20, forming a track along which a small truck may be moved. This truck carries a receptacle 22 for the milk or other liquid to be desiccated. The receptacle is so constructed that as it moves along the track, the milk is delivered to the surfaces of the drums. The receptacle preferably terminates in a conical bottom 23 having a spray nozzle 24 located between the two drums and as near as possible to the line of tangency of the two drums. The nozzle is of such size and so located in respect to the drums that it can only deliver to a small portion of the surface at one time, but by moving the truck and receptacle along the track and longitudinally of the drums, all portions of the surfaces of the drums may be reached by the spraying nozzle.

Any suitable mechanism may be provided for moving the truck, receptacle and nozzle at a uniform speed in respect to the speed of rotation of the drums. For instance, I may provide the shaft of one of the drums with a pulley 25, which by means of a belt 26, transmits motion to a transverse shaft 28 journaled above the drums and adjacent one end thereof. Motion is transmitted from the shaft 28 to a countershaft 29 in any suitable manner, as, for instance, by an intermediate shaft 30 and pairs of intermeshing bevel gears 31 and 32. The countershaft 29 is provided with a sprocket wheel over which travels a chain 33, the speed of travel of which is equal to the desired speed of travel of the receptacle 22. The chain is provided with a lug or projection 35 extending through a vertically-disposed slot 36 in a plate 37 carried by the truck, the length of the slot being equal to the diameter of the sprocket wheels which support the chain 33. As the drums rotate, motion is transmitted through the pulley 25 and belt 26 to the upper shaft 28 and thence through the shafts 30 and 29 to the chain 33. The movement of the chain and its lug or projection 35 causes the truck to travel along the track at the same rate as the chain until the plate reaches one of the sprocket wheels, at which time the lug passes vertically through the slot to the opposite end thereof and the truck is returned in the opposite direction by the continued movement of the chain. The receptacle 22 is thus moved back and forth longitudinally of the rotating drums and at a uniform speed in respect thereto.

In order to secure the objects hereinafter more clearly set forth, there is provided means for automatically shutting off the supply of fluid to the spraying nozzle 24 while the receptacle is traveling in one direction, and automatically opening the valve to permit a flow of fluid to the nozzle while the receptacle is traveling in the opposite direction. This means includes a valve 38, adjacent the nozzle, and two pivotally-mounted pawls 39 and 40, so mounted in respect to the nozzle that when the receptacle reaches one end of the drum, one pawl engages with the valve stem, to operate the valve and shut off the supply; while the engagement of the valve stem with the other pawl operates said valve stem to open the valve. In this manner, the nozzle sprays liquid upon the surfaces of the drums only while traveling in one direction, the valve being closed during the return movement.

For removing the dried or desiccated material from the surfaces of the drums, I provide scrapers adapted to engage with said surfaces and also adapted to travel longitudinally of the drums simultaneously with the receptacle 22 and spraying nozzle. The scrapers for the two drums are disposed upon opposite sides as the two drums rotate in opposite directions. For operating the scrapers, I provide for each of them a chain 42 mounted on sprocket wheels at opposite ends of the corresponding drums and having the same speed as the chain 33. The chain 42 is driven from the shaft 28 by a chain 41, so that the two chains 33 and 42 will operate in synchronism. Adjacent the chain 42 is a guideway or support 43 for a sliding plate 44, which latter has a vertically-disposed slotted extension 45 lying adjacent the chain. The chain carries a small plate 46 vertically-movable within the slot of the plate 45, and connected to the sliding plate 46 is an arm or lever 49. The arm is pivoted to a standard 48 carried by the plate 44 and has rigid therewith a brush 50 and a scraper 52. When the plate 44 is moved in one direction by the action of a chain and the arm 49 is in its depressed position, the scraper 42 is held in engagement with the surface of the drum to remove therefrom the dried material. When the plate 44 is moved in the opposite direction, the scraper 52 is dropped out of engagement with the drum and the brush 50 is dropped into a trough 51 to move lengthwise of the trough the material which was scraped from the drum and accumulated in the trough during the last previous operation trip of the scraper. Thus, the scraper and brush operate alternately to remove the material from the drum and convey it lengthwise of the receiving trough to a diagonal chute or conduit 54.

The scraper is so mounted in respect to the distributing nozzle 24 that during the time the nozzle is delivering liquid to the surfaces of the drums, the scraper is traveling slightly in advance of the sprayer and is scraping off that portion of the material which was delivered to the drum upon the previous spraying trip of the nozzle. When the scraper and nozzle reach the end of their respective courses, both are thrown out of operation and returned to the opposite end of the drum, during which time the material upon the surface of the drum is thoroughly dried and hardened by the heating action, and rendered uniform in thickness and dense in structure by the crushing action between the two drums. As the sprayer travels longitudinally of the drum during the rotation of the latter, it is evident that the film is applied to the drum in the form of a helical strip, all portions of which remain on the drum during a plurality of revolutions of the latter, so as to be compressed a plurality of times before it is removed by the scraper. This scraper also travels longitudinally during the rotation, so as to remove the dried and powdered material along a helical path. The mere heating of the interior of the drums is not sufficient to dry the material in the manner desired to convey from the surface of the material, the moisture arising therefrom. Therefore, in addition to the heating means above described, I provide a casing 56, disposed below the drums and substantially parallel to the lower portion of each of them. At a point directly beneath the line of tangency of the two drums, there is provided a conduit 57 serving to deliver heated and artificially dried air into engagement with both drums, said air passing upwardly into engagement with the lower surfaces of the drums and then flowing downwardly and outwardly adjacent the under surfaces thereof, as is indicated by the arrows. The exhaust air preferably passes into engagement with the under surfaces of the troughs to maintain them at the desired temperature.

The raw milk in its natural state is delivered from a tank 58 in a refrigerating room through a suitable conduit 59 into the receptacle 22 of the desiccating and drying apparatus. The drums are internally heated to a temperature ranging from 110 to 150 degrees Fahrenheit, and the warm and artificially dried air is delivered into engagement with the under surfaces of the drums. The milk is delivered in a very thin film and is permitted to remain on the surfaces of the drums to be thoroughly dried, rolled and hardened during a plurality of revolutions of said drums. The milk becomes transformed to a hard coating, which when scraped off by the hard scraper 52 or other mechanism, produces a white finely subdivided powder. The powder is removed from the troughs by the brushes 50, and from the conduit 54 it passes to a screen 60 continuously oscillated in any suitable manner. The fine milk powder after having passed through the screen 60 is delivered through a conduit 67 to a receiver 68 in the packing room, where it is quickly placed in air-tight receptacles. The conduit 67 is heated by a suitable steam jacket 69, which maintains the milk powder at sufficiently high temperature to thoroughly sterilize the same, and the air in the packing room is also preferably sterilized before being admitted thereto.

In my improved process, the milk is almost instantaneously evaporated after being delivered to the surfaces of the drums, but is evaporated at a temperature below the boiling point of water or milk. If too high a temperature is employed, the albumens may coagulate, the caseins be chemically transformed, and various other changes brought about which would render the milk product insoluble or partially insoluble in water; but by thoroughly evaporating the milk to a completely dry state while at a temperature ranging from 110 degrees to 150 degrees, Fahrenheit and while being repeatedly rolled, no chemical changes are brought about in the milk which would interfere in any way with the free solubility of the latter. It is entirely unnecessary to add sugar, a preservative, or any other substance to the milk before treating the same, and the resulting product, therefore, consists of merely the solids of the milk in such a form as to be freely soluble in water, and when dissolved to form a product exactly similar to fresh milk. The milk is thoroughly sterilized as soon as it leaves the desiccating apparatus and is then immediately packed in air-tight receptacles before any oxidation, decomposition, or other chemical changes take place.

Having thus described my invention, I claim as new and desire to secure by Letters Patent:

1. The herein described process of desiccating liquid or semi-liquid substances, consisting in partially drying the substance upon a surface heated to a temperature from 110 to 150 degrees Fahrenheit, pressing the partially dried substance upon said surface by a rolling action to render the coating uniform and to expel the moisture, continuing the heating and repeating the pressing and rolling until the coating assumes a hard, dry, compact form, and scraping the coating from the surface.

2. The herein described process of desiccating liquid or semi-liquid substances, consisting in partially drying the substance upon a surface heated to a temperature below the coagulating point of the substance, alternately blowing artificial drying warm air upon said substance and pressing the partially dried substance upon said surface by a rolling action to render the coating uniform and to expel the moisture, continuing the heating and repeating the pressing and rolling until the coating assumes a hard, dry, compact form, and scraping the coating from the surface.

3. The herein described process of desiccating liquid or semi-liquid substances, which consists in spreading same in a thin layer upon a surface heated below the coagulating point of the substance, subjecting each portion of said layer for a brief period at stated intervals to the action of a current of artificially dried warm air and compressing said layer, substantially as described.

4. The herein described process of desiccating liquid or semi-liquid substances which consists in spreading same in a thin layer upon a surface heated below the coagulating point of the substance, subjecting each portion of said layer for a brief period at stated intervals to the action of a current of artificially dried warm air, and compressing said layer immediately after being subjected to said current of air substantially as described.

5. The herein described process of desiccating liquid or semi-liquid substances, which consists in spreading same in a thin layer, continuously subjecting said layer to a uniform temperature below 150 degrees Fahrenheit and alternately subjecting same to pressure to expel the moisture and to the action of artificially dried and heated air.

6. The herein described process of producing a dry powder from milk which consists in spreading fresh milk in a thin layer, subjecting one side of said layer continuously to a temperature below the coagulating point of the milk, and alternately subjecting the other side of said layer to pressure and to the action of a current of heated air until said layer becomes hard and compact, and then reducing said layer to a powder.

7. The herein described process of producing a dried powder from milk, which consists in spreading fresh untreated milk containing the natural constituents thereof in a thin layer, continuously subjecting said layer to a uniform temperature below 150° F., alternately subjecting said layer to pressure to expel the moisture, then subjecting the layer to the action of air at normal temperature and then subjecting said layer to the action of artificially dried and heated air until said layer becomes hard and compact and finally reducing said layer to a powder.

In testimony whereof I have signed my name to this specification in the presence of two subscribing witnesses.

JOHN ROEH.

Witnesses:
 G. W. VAN DYKE,
 A. W. WITHERSPOON.